(12) United States Patent
Sato et al.

(10) Patent No.: US 10,419,534 B2
(45) Date of Patent: Sep. 17, 2019

(54) RELAY METHOD AND RELAY APPARATUS

(71) Applicant: FUJITSU LIMITED, Kawasaki-shi, Kanagawa (JP)

(72) Inventors: Izuru Sato, Chiyoda (JP); Toshihiko Kurita, Kawasaki (JP); Kenichi Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 195 days.

(21) Appl. No.: 15/429,581

(22) Filed: Feb. 10, 2017

(65) Prior Publication Data
US 2017/0251057 A1 Aug. 31, 2017

(30) Foreign Application Priority Data

Feb. 29, 2016 (JP) .................................. 2016-038027

(51) Int. Cl.
*G06F 15/16* (2006.01)
*H04L 29/08* (2006.01)
(Continued)

(52) U.S. Cl.
CPC .......... *H04L 67/1095* (2013.01); *G06F 16/22* (2019.01); *G06F 16/2455* (2019.01);
(Continued)

(58) Field of Classification Search
CPC ......... G06F 17/30312; G06F 17/30477; H04L 67/1095; H04L 67/1097; H04L 67/2842; H04L 67/42
(Continued)

(56) References Cited

U.S. PATENT DOCUMENTS 6,453,319 B1 9/2002 Mattis et al.
2003/0165129 A1 9/2003 Sharma et al.
(Continued)

FOREIGN PATENT DOCUMENTS

JP 2002-511616 4/2002
JP 2003-309570 10/2003
(Continued)

OTHER PUBLICATIONS

George Xylomenos et al., "A Survey of Information-Centric Networking Research," IEEE Communications Surveys & Tutorials, vol. 16, No. 2, 2014, pp. 1024-1049, Jul. 19, 2013.

*Primary Examiner* — Frantz B Jean
(74) *Attorney, Agent, or Firm* — Staas & Halsey LLP

(57) ABSTRACT

A relay method includes receiving, by a first relay apparatus, a packet that includes a search formula for the target data from a terminal apparatus; acquiring the search formula from the packet; decomposing the search formula into a plurality of keywords; acquiring, for each of the plurality of keywords, fit data existing in the database from among the data of request target by searching out data corresponding to the keyword from the database of the first relay apparatus; requesting a second relay apparatus for missing data that does not exist in the database from among the data of request target; acquiring, by the second relay apparatus, the missing data; receiving, by the first relay apparatus, the missing data; combining the fit data and the missing data with each other to generate the data of request target; and transmitting the generated data of request target to the terminal apparatus.

10 Claims, 9 Drawing Sheets

(51) Int. Cl.
    *G06F 16/22*     (2019.01)
    *G06F 16/2455*     (2019.01)
    *H04L 29/06*     (2006.01)
    *H04L 12/741*     (2013.01)

(52) U.S. Cl.
    CPC ...... *H04L 67/1097* (2013.01); *H04L 67/2842* (2013.01); *H04L 67/327* (2013.01); *H04L 67/42* (2013.01); *H04L 45/74* (2013.01)

(58) Field of Classification Search
    USPC .......................................................... 709/219
    See application file for complete search history.

(56) References Cited

U.S. PATENT DOCUMENTS

| | | | |
|---|---|---|---|
| 2009/0287835 A1 | 11/2009 | Jacobson | |
| 2013/0166668 A1* | 6/2013 | Byun | H04L 67/322 709/207 |
| 2015/0172413 A1 | 6/2015 | Yoneda et al. | |
| 2016/0087881 A1* | 3/2016 | Ge | H04L 45/42 709/244 |

FOREIGN PATENT DOCUMENTS

| | | |
|---|---|---|
| JP | 2009-277234 | 11/2009 |
| JP | 2015-136098 | 7/2015 |

* cited by examiner

FIG. 3

FIB

| Prefix | Next FACE |
|---|---|
| /ABCdenki/kawasaki | 1 |
| /ABCdenki/kamata | 2,5 |
| ..... | ..... |

PIT

| CONTENT NAME/KEYWORD | Requested FACE |
|---|---|
| /ABCdenki/kawasaki/ns/icn | 2 |
| /Tokyo/olympic | 3 |
| ..... | ..... |

CS

| CONTENT NAME | SEARCH FORMULA | CONTENT DATA |
|---|---|---|
| /ABCdenki/a | PC & mobile | ..... |
| /Osaka/festvial | Danjiri | ..... |
| ..... | ..... | ..... |

EXAMPLE 1

EXAMPLE 2

EXAMPLE 3

EXAMPLE 4

RELAY METHOD AND RELAY APPARATUS

CROSS-REFERENCE TO RELATED APPLICATION

This application is based upon and claims the benefit of priority of the prior Japanese Patent Application No. 2016-038027, filed on Feb. 29, 2016, the entire contents of which are incorporated herein by reference.

FIELD

The embodiment discussed herein is related to a relay method and a relay apparatus.

BACKGROUND

Different from a network technology in which communication is performed based on an internet protocol (IP) address or the like, as a network technology in which communication is performed based on the name of a content, information centric networking (ICN) has been and is being investigated and developed (for example, refer to Japanese Laid-open Patent Publication No. 2015-136098 and George Xylomenos et al., "A Survey of Information-Centric Networking Research," COMMUNICATIONS SURVEYS AND TUTORIALS, VOL. 16, No. 2, 2014, pp. 1024-1049). As an investigation project for ICN, content centric networking (CCN) (for example, Japanese Laid-open Patent Publication No. 2009-277234), named data network (NDN) or the like is available.

For example, in the NDN, a request for content data from a client apparatus may be defined as "interest message." In the interest message, a name of a content to be requested (hereinafter, abbreviated to "content name") may be included. Each relay node in a network may relay an interest message to a server that provides the pertinent content in accordance with a forward information base (FIB) in which a relay destination corresponding to the content name is registered.

The server may generate a response defined as "data message" from content data corresponding to the content name in the interest message and transmit the response to the network. Each relay node in the network may relay the data message to the client apparatus along the route in the opposite direction to the relaying direction of the interest message.

The relay node may cache content data in the data message to be relayed into a database called content store (CS). If the content name in the interest message fully coincides with a content name of the data cached in the CS (hereinafter, abbreviated to "cache data"), the relay node may generate a data message including the cache data and transmit the data message to the client apparatus. Therefore, the relay node may not relay an interest message for requesting content data having a content name same as that of the cached data to the server.

In the NDN, a technology called keyword based content retrieval (KBCR) may be prescribed in which content data searched out from one or more servers is acquired based on a keyword. According to the KBCR, a search formula for a keyword is included into an interest message in place of the content name. This makes it possible to collect a plurality of content data that coincide with the keyword from a server or servers using a single interest message. Therefore, the convenience may be improved.

As described above, the relay node may transmit cache data to the client apparatus only when the content name in an interest message fully coincides with the content name of the cache data. Therefore, even if a large number of content data searched out using a keyword are cached in the CS in accordance with the KBCR, it may be difficult for the relay node to utilize the cache data unless the content names fully coincide with each other.

For example, it is assumed that a plurality of content data collected using a keyword "curry and rice" are cached in the CS. In this case, even if the relay node receives an interest message including a search formula of keywords "curry and rice" & (this signifies "and") "potato," since the content name is not included in the interest message, the relay node may fail to utilize the cache data relating to the keyword "curry and rice."

Therefore, in the network, the interest message is relayed from the relay node to the server and a plurality of data messages corresponding to the interest message are relayed from the server to the client apparatus. Accordingly, the use rate of the transmission bandwidth may increase. Such a problem as just described may occur in a network system in which search for and acquisition of content data using a keyword are performed such as the KBCR. Taking the foregoing into consideration, it is desirable to be capable of reducing the use rate of the transmission bandwidth.

SUMMARY

According to an aspect of the embodiment, a relay method executed by a system that includes a first relay apparatus and a second relay apparatus each of which stores data of request target transmitted from a server and requested by a terminal apparatus into a database and relays the data of request target to the terminal apparatus, the relay method includes receiving, by the first relay apparatus, a packet that includes a search formula for the target data from the terminal apparatus; acquiring the search formula from the packet; decomposing the search formula into a plurality of keywords; acquiring, for each of the plurality of keywords, fit data existing in the database from among the data of request target by searching out data corresponding to the keyword from the database of the first relay apparatus; requesting the second relay apparatus for missing data that does not exist in the database from among the data of request target; acquiring, by the second relay apparatus, the missing data requested from the first relay apparatus; receiving, by the first relay apparatus, the missing data from the second relay apparatus; combining the fit data and the missing data with each other to generate the data of request target; and transmitting the generated data of request target to the terminal apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of an FIB, a pending interest table (PIT) and a CS;

DESCRIPTION OF EMBODIMENT

Figure 1:
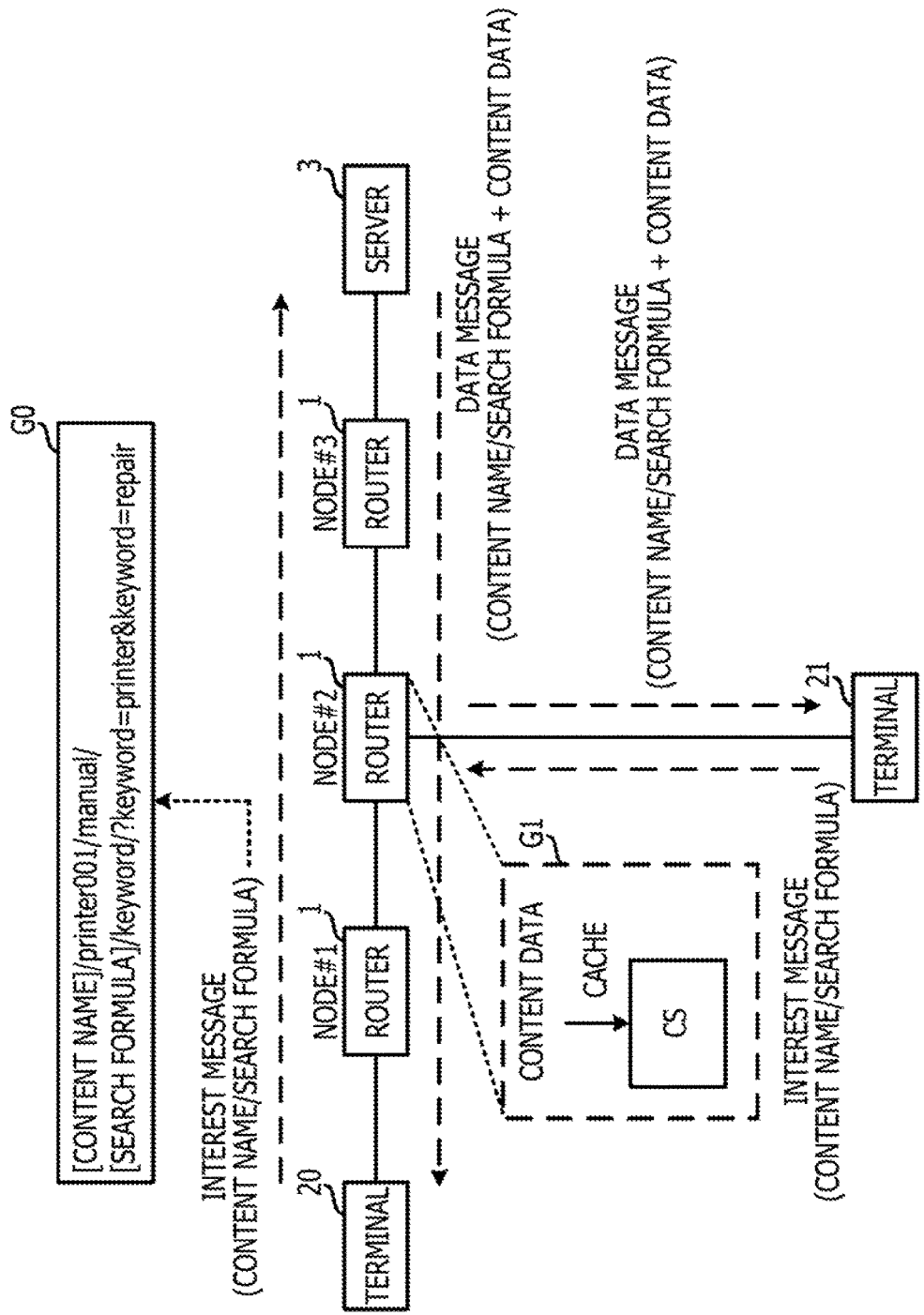
FIG. 1 is a block diagram depicting an example of a network.

FIG. 1 is a block diagram depicting an example of a network. The network includes a plurality of terminals 20 and 21 such as computers, a plurality of routers 1 each of which is an example of a relay apparatus, and a server 3 that provide a given content to the terminals 20 and 21.

The network operates based on the NDN described above. Each of the plurality of routers 1 is an example of a relay system. The plurality of routers 1 relay an interest message and a data message between the terminals 20 and 21 and the server 3. The interest message is a packet for requesting the server 3 for content data. The interest message includes a content name or a search formula for a content as indicated by reference symbol G0.

In the present example, "/printer001/manual/" is used as the content name. If "/printer001/manual/" is designated in the interest message, a content having the pertinent content name is acquired from the server 3.

In the present example, "/keyword/?keyword=printer&keyword=repair" is used as the search formula. Here, "keyword" at the top is an identifier indicating that the search formula is that of an interest message. "&" indicates "and" of a search condition. If "/keyword/?keyword=printer&keyword=repair," is designated in the interest message, contents relating to both of the two keywords "printer" and "repair" are searched out and acquired from the server 3.

The data message is a packet of a response to an interest message. The data message includes a content name or a search formula designated by the pertinent interest message and content data of the content name or the search formula.

In the network of the present example, the router 1 that operates based on the NDN is provided in each of nodes #1 to #3 between the terminal 20 and the server 3. The different terminal 21 is coupled with the router 1 of the node #2.

If the terminal 20 transmits an interest message, the routers 1 of the respective nodes #1 to #3 relay the interest message to the server 3. The server 3 generates a data message including content data corresponding to the content name or the search formula of the interest message and transmits the data message in response to the interest message. The routers 1 of the respective nodes #1 to #3 relay the interest message to the server 3. Each of the terminals 20 and 21 is an example of a requesting apparatus that requests for content data. The content data is an example of data of a request target.

A CS, as an example of a database of content data, is provided in the router 1. The router 1 caches content data included in a data message to be relayed into the CS in response to an operation setting. As an example, the router 1 of the node #2 caches the content data requested by the terminal 20 into the CS and relays the content data to the terminal 20 as indicated by reference symbol G1. Also the routers 1 of the other nodes #1 and #3 may cache the content data.

In the CS, the content data is stored in an associated relationship with a content name or a keyword of a search formula. The data stored in the CS is abbreviated to "cache data." When the interest message is received from the terminal 20 or 21, the router 1 may utilize cache data that fully coincides with the content name or cache data that fits with the keyword of the search formula to generate a data message.

For example, when the terminal 20 transmits an interest message, if content data that fully coincides with the content name is stored in the CS of the router 1 of the node #2, the router 1 generates a data message including the pertinent content data and transmits the data message to the terminal 20. Therefore, the router 1 of the node #2 may not relay the interest message to the server 3. Therefore, the use rate of the transmission bandwidth of the network may be reduced.

Also when a search formula is designated in an interest message, the router 1 searches the CS for cache data that fits with the keyword of the search formula and relays the interest message that requests for content data other than searched out content data to the router 1 of a different node. Consequently, the router 1 acquires the content data requested by the interest message and generates and transmits a data message. Since the router 1 effectively utilizes the cache data in the CS in this manner, the hit rate of the cache in the CS in the entire relay system may be improved. Accordingly, the transmission bandwidth of the network may be saved and the use rate may be reduced. Details of a configuration and an operation of the router 1 are described below.

Figure 2:
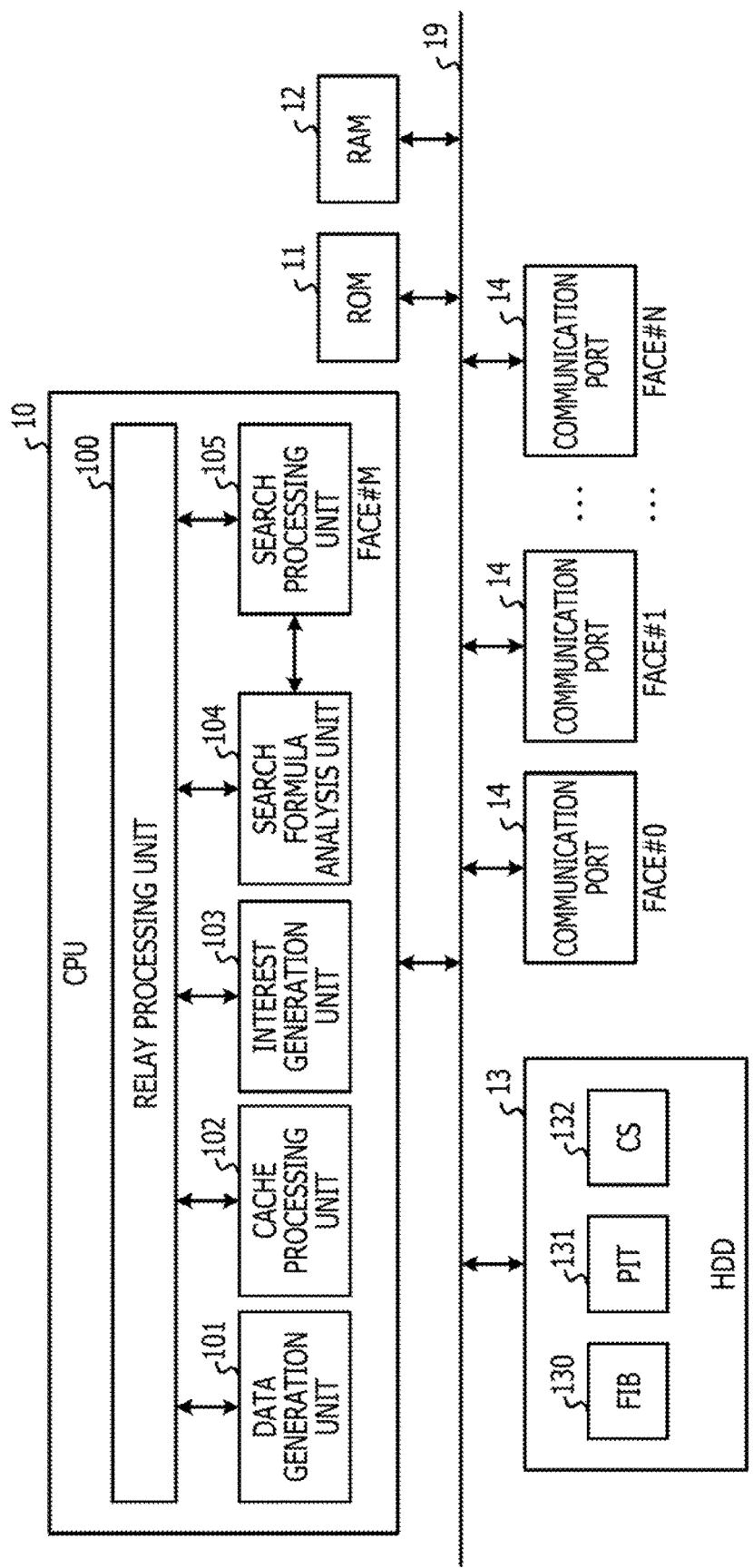
FIG. 2 is a block diagram depicting an example of a router.

FIG. 2 is a block diagram depicting an example of the router 1. The router 1 includes a central processing unit (CPU) 10, a read only memory (ROM) 11, a random access memory (RAM) 12, a hard disk drive (HDD) 13 and a plurality of communication ports 14. The CPU 10 is coupled to the ROM 11, RAM 12, HDD 13 and plurality of communication ports 14 through a bus 19 such that inputting and outputting of a signal may be performed between them.

The ROM 11 stores a program for driving the CPU 10. The RAM 12 functions as a working memory of the CPU 10. Each of the communication ports 14 is, for example, a physical layer (PHY) chip. The communication port 14 transmits and receives a corresponding packet to and from the terminal 20 or 21, the server 3 or the different router 1. A host address of a communication destination such as an IP address is not included in the packet. A content name and a search formula are included in the packet as described above.

In the NDN, a transmission destination of the packet is designated by a FACE number. For example, FACE#0 to FACE#N (N is a positive integer) are allocated to individual ones of the communication ports 14. The packet is transferred to a destination corresponding to the FACE number.

If the CPU 10 reads in a program from the ROM 11, a relay processing unit 100, a data generation unit 101, a cache processing unit 102, an interest generation unit 103, a search formula analysis unit 104 and a search processing unit 105 are formed as functions. In the HDD 13, an FIB 130, a PIT 131 and a CS 132 are stored. A nonvolatile memory such as an erasable programmable ROM (EPROM) or the like may be used in place of the HDD 13.

In FIG. 3, an example of the FIB 130, PIT 131 and CS 132 is illustrated. The FIB 130 is a table indicating a transfer destination of an interest message. In the FIB 130, "Prefix" and "Next FACE" are registered in an associated relationship with each other.

"Prefix" is a content name or a keyword designated by the interest message. "Next FACE" is one or more FACE numbers indicating a transfer destination or destinations of the interest message. In the case of the content name, a name of a hierarchical configuration is registered in "Prefix." The interest message is transferred to a communication port 14 of "Next FACE" corresponding to "Prefix" in which the number of characters that coincide with those of the content name is the greatest.

In the following description, an item registered in the FIB 130 is abbreviated to "FIB entry." The FIB entry is generated by communication between the respective routers 1. When an interest message is received, FIB entries are searched in order to determine a transfer destination of the interest message.

The PIT 131 is a table indicating a transmission source of an interest message, for example, a transfer destination of a data message. In the PIT 131, a content name or a keyword and "Requested FACE" are registered in an associated relationship with each other. "Requested FACE" is one or more FACE numbers indicating a transmission source of the interest message, for example, a requester for the content data. The data message is transferred or transmitted to a communication port 14 of "Requested FACE" corresponding to the content name or the keyword of the search formula of the content data.

In the following description, an item registered in the PIT 131 is abbreviated to "PIT entry." The PIT entry is generated upon reception of an Interest message and is searched in order to determine, upon transfer or transmission of the data message, a destination of the data message. One PIT entry may include a plurality of FACE numbers if they are common in the content name or the keyword.

In the CS 132, content data acquired from a data message is stored as cache data in an associated relationship with a content name or a search formula of the content data. The content data in the CS 132 is used for generation of a data message when the content name of the content data fully coincides with the content name designated in the interest message.

When the search formula of the content data in the CS 132 fits with at least part of the keywords of the search formula designated in the interest message, at least part of the content data is used for generation of the data message. For example, where the search formula corresponding to the content data is "PC & mobile," when "PC" is designated in the interest message, the content data is used in a data message.

Referring to FIG. 2 again, the relay processing unit 100 manages the FIB 130 and the PIT 131. The relay processing unit 100 refers to the FIB 130 and the PIT 131 to perform a relay process of a packet through a communication port or ports 14.

For example, the relay processing unit 100 receives a data message from a different router 1. Thereafter, the relay processing unit 100 searches the PIT entries and transfers the data message from a pertinent communication port 14. At this time, the relay processing unit 100 instructs the cache processing unit 102 to cache the content data.

The cache processing unit 102 caches the content data in the data message of a relay target as cache data corresponding to the content name and the search formula into the CS 132 in accordance with the instruction of the relay processing unit 100. The cache data is used for generation of a data message by the data generation unit 101.

The relay processing unit 100 is an example of a first reception unit and receives an interest message from the terminal 20 or 21. At this time, the relay processing unit 100 searches the PIT entries. If a pertinent PIT entry does not exist, the relay processing unit 100 generates a PIT entry in accordance with the content name or the keyword of the search formula of the interest message.

Then, the relay processing unit 100 instructs the search processing unit 105 to search the cache data based on the content name or the keyword of the search formula designated in the interest message. If pertinent cache data does not exist in the CS 132, the relay processing unit 100 searches the FIB entries and transfers the interest message from the pertinent communication port 14.

The search processing unit 105 searches the cache data in the CS 132 for the cache data based on the content name or the keyword of the search formula designated in the interest message in accordance with the instruction of the relay processing unit 100. For example, the search processing unit 105 searches for the cache data that fully coincides with the content name or the search formula. The search processing unit 105 notifies the relay processing unit 100 of a result of the search.

If cache data that fully coincides with the content name or the search formula designated in the interest message exists, the relay processing unit 100 generates a data message including the pertinent cache data. The relay processing unit 100 searches out the PIT entry and transmits the generated data message from the pertinent communication port 14.

When pertinent cache data does not exist in the CS 132 as a result of the search, if the interest message has a search formula designated therein, the search processing unit 105 instructs the search formula analysis unit 104 to analyze the search formula. The search formula analysis unit 104 is an example of a decomposition processing unit. The search formula analysis unit 104 acquires the search formula from the interest message and decomposes the search formula into keywords. The search formula analysis unit 104 notifies the search processing unit 105 of the keywords obtained by the decomposition.

The search processing unit 105 extracts from the CS 132 cache data corresponding to the search formula that includes the keywords conveyed from the search formula analysis unit 104. Consequently, the search processing unit 105 searches the CS 132 for cache data fitting with the keywords as fit data. Here, the fit data is at least part of content data requested by the interest message. The fit data is used for generation of a data message by the data generation unit 101. The search processing unit 105 notifies the relay processing unit 100 of a result of the search.

The search processing unit 105 has a FACE number allocated thereto similarly to the communication ports 14. In the example of FIG. 2, the search processing unit 105 has FACE#M (M is a positive integer) allocated thereto. When the relay processing unit 100 outputs an interest message to the search processing unit 105, it manages the output destination as FACE#M.

If fit data is searched out by the search processing unit 105, the relay processing unit 100 instructs the interest generation unit 103 to generate an interest message for requesting for data other than the fit data from among the requested content data.

The interest generation unit 103 is an example of a request processing unit. The interest generation unit 103 requests a different router 1 for data other than the fit data from among the requested content data. For example, the interest generation unit 103 generates a search formula for searching for data missing in the CS 132 (hereinafter, abbreviated to "missing data") from among the requested content data. Then, the interest generation unit 103 generates an interest message in which the search formula is designated. The interest generation unit 103 outputs the generated interest message to the relay processing unit 100. Consequently, the interest generation unit 103 transmits the generated search formula to a different router 1.

The relay processing unit 100 transmits the interest message generated by the interest generation unit 103 to a different router 1 through a communication port 14 corresponding to a result of the search of the FIB 130. At this time, the relay processing unit 100 adds a FACE number pertinent to the transmitted interest message to the PIT entry.

At this time, the relay processing unit 100 receives missing data requested by the interest generation unit 103 from the different router 1. The relay processing unit 100 is an example of a second reception unit. For example, the relay processing unit 100 receives a data message in response to the interest message generated by the interest generation unit 103. Then, the relay processing unit 100 outputs the content data, for example, the missing data, to the data generation unit 101.

The data generation unit 101 is an example of a generation unit. The data generation unit 101 combines the missing data received by the relay processing unit 100 and the fit data with each other to generate content data requested by the interest message. For example, the data generation unit 101 combines the fit data searched out from the CS 132 by the search processing unit 105 and the missing data received from the different router 1 with each other to generate content data in accordance with the search formula designated by the interest message from the terminal 20 or 21, and determines the content data as a data message. At this time, the relay processing unit 100 transmits the data message including the content data generated by the data generation unit 101 to the terminal 20 or 21. The relay processing unit 100 is an example of a transmission unit.

Figure 4:
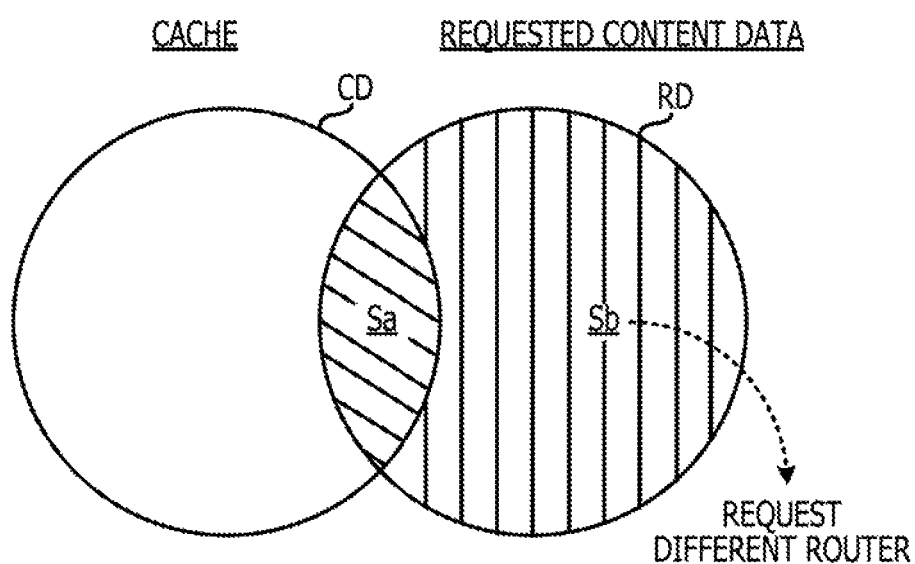
FIG. 4 is a view illustrating an example of a relationship between a set of cache data and a set of requested content data.

In FIG. 4, an example of a relationship between a set CD of cache data and a set RD of requested content data is illustrated. FIG. 4 exemplifies the relationship in a case in which the router 1 receives an interest message in which a search formula is designated and fit data that fits with part of keywords of the search formula exists in the CS 132.

An overlapping range Sa of the set CD of cache data and the set RD of requested content data indicates a set of fit data searched out by the search processing unit 105. The search processing unit 105 searches the cache data in the CS 132 for each of the keywords obtained by the decomposition of the search formula. Consequently, the set Sa of the fit data is obtained as a subset of the set RD of the requested content data.

The fit data is part of the requested content data existing in the CS 132. Therefore, the router 1 does not request the different router 1 for fit data.

A subset Sb of the set RD of the requested content data from which the set Sa of the fit data is removed indicates a set of the missing data that does not exist in the CS 132. The missing data is part of the requested content data and does not exist in the CS 132. Therefore, the router 1 requests a different router 1 for missing data.

At this time, the interest generation unit 103 requests for only part of the requested content data instead of for all of the requested content data. Therefore, the traffic amount of content data to be received from the different router 1 may be reduced, by transfer of the interest message, from that when all of the requested content data are received. Accordingly, the transmission bandwidth in the network used by the content data may be reduced.

As described above, the interest generation unit 103 generates a search formula for searching for missing data and transmits the search formula to a different router 1 through the relay processing unit 100.

The interest message in which the search formula is designated is not transmitted to a communication port 14 of a FACE number pertinent to all of the requested content data. The interest message is transmitted to the communication ports 14 of FACE numbers pertinent only to part of the requested content data. Therefore, the traffic amount of the interest message in the network may be reduced further when all of the content data are requested, for example, when the interest message received from the terminal 20 or 21 is transferred. Accordingly, the transmission bandwidth in the network used by the interest message may be reduced.

The router 1 receives a data message including the missing data from the different router 1. Then, the router 1 combines the missing data with the fit data existing in the CS 132 to generate requested content data. For example, the relay processing unit 100 receives the missing data from the different router 1. Then, the data generation unit 101 combines the missing data and the fit data with each other to generate requested content data.

In short, the data generation unit 101 combines, from within the set RD of the requested content data, the subset Sa corresponding to the fit data existing in the CS 132 and the subset Sb corresponding to the missing data that do not exist in the CS 132 with each other to generate a set RD of the requested content data. The relay processing unit 100 transmits a data message in which the generated requested content data are included to the terminal 20 or 21.

Therefore, the terminal 20 or 21 may receive the content data requested using the interest message.

Figure 5:
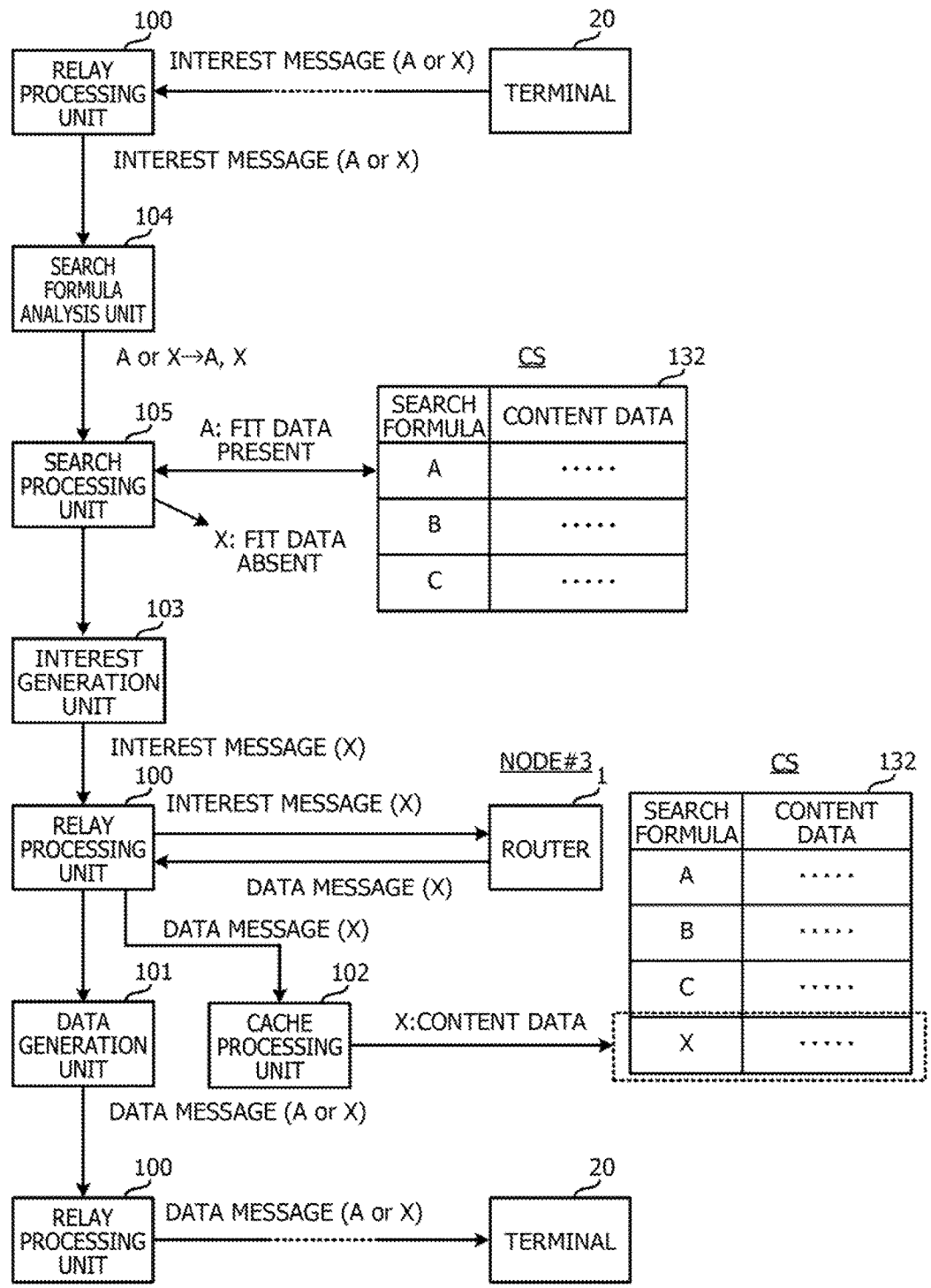
FIG. 5 is a view illustrating an example of operation of a router.

In FIG. 5, an example of operation of the router 1 is illustrated. In the example depicted in FIG. 5, operation when the router 1 of the node #2 in FIG. 1 receives an interest message in which a search formula "A or X" is designated from the terminal 20 is illustrated. "A" and "X" are keywords for the search. "or" signifies "or" in the search.

In the present example, it is assumed that, although cache data corresponding to the search formula "A or X" does not exist in the CS 132 of the router 1 of the node #2, cache data corresponding to the search formula "A" exists. Further, it is assumed that cache data corresponding to the search formula "X" exists in the CS 132 of the router 1 of the node #3. In the following, each process is successively described in accordance with directions indicated by arrow marks.

The relay processing unit 100 receives an interest message in which the search formula "A or X" is designated from the terminal 20. The relay processing unit 100 decides, as a result (not depicted) of the search of the search processing unit 105, that cache data that fully coincides with the search formula does not exist in the CS 132. Therefore, the relay processing unit 100 outputs an interest message to the search formula analysis unit 104. The search formula analysis unit 104 acquires the search formula "A or X" from the interest message and decomposes the search formula into the keywords "A" and "X." The search formula analysis unit 104 outputs the keywords "A" and "X" obtained by the decomposition to the search processing unit 105.

The search processing unit 105 searches the CS 132 for fit data that fit with the keywords "A" and "X." In the CS 132 of the present example, content data corresponding to the keyword "A" (pertinent to the subset Sa of FIG. 4) exists. However, content data corresponding to the keyword "X" (pertinent to the subset Sb of FIG. 4) does not exist. Therefore, the search processing unit 105 notifies the relay processing unit 100 that, as a result of the search, although fit data of the keyword "A" exists, fit data of the keyword "X" does not exist.

The interest generation unit 103 generates a search formula "X" for searching for content data corresponding to the keyword "X" as missing data in accordance with an instruction of the relay processing unit 100 by which the notification is received. Then, the interest generation unit 103 generates an interest message including the search formula "X." The interest generation unit 103 outputs the generated interest message to the relay processing unit 100. The relay processing unit 100 transmits the interest message to the router 1 of the node #3.

The relay processing unit 100 receives a data message including the content data searched out in accordance with the search formula "X" from the router 1 of the node #3. Then, the relay processing unit 100 outputs the received message to each of the data generation unit 101 and the interest generation unit 103. The cache processing unit 102 acquires the content data searched out in accordance with the search formula "X" from the data message and registers the content data into the CS 132. Therefore, in the CS 132, the content data corresponding to the search formula "X" newly becomes available.

The data generation unit 101 acquires the content data searched out in accordance with the search formula "X" from the data message. Then, the data generation unit 101 combines the acquired content data with the content data corresponding to the search formula "A" in the CS 132 to generate content data corresponding to the search formula "A or X" (the data pertinent to the set RD of FIG. 4). The data generation unit 101 generates a data message including the generated content data and outputs the data message to the relay processing unit 100.

The relay processing unit 100 transmits the data message generated by the data generation unit 101 to the terminal 20. Consequently, the terminal 20 acquires the content data requested through the interest message.

Figure 6:
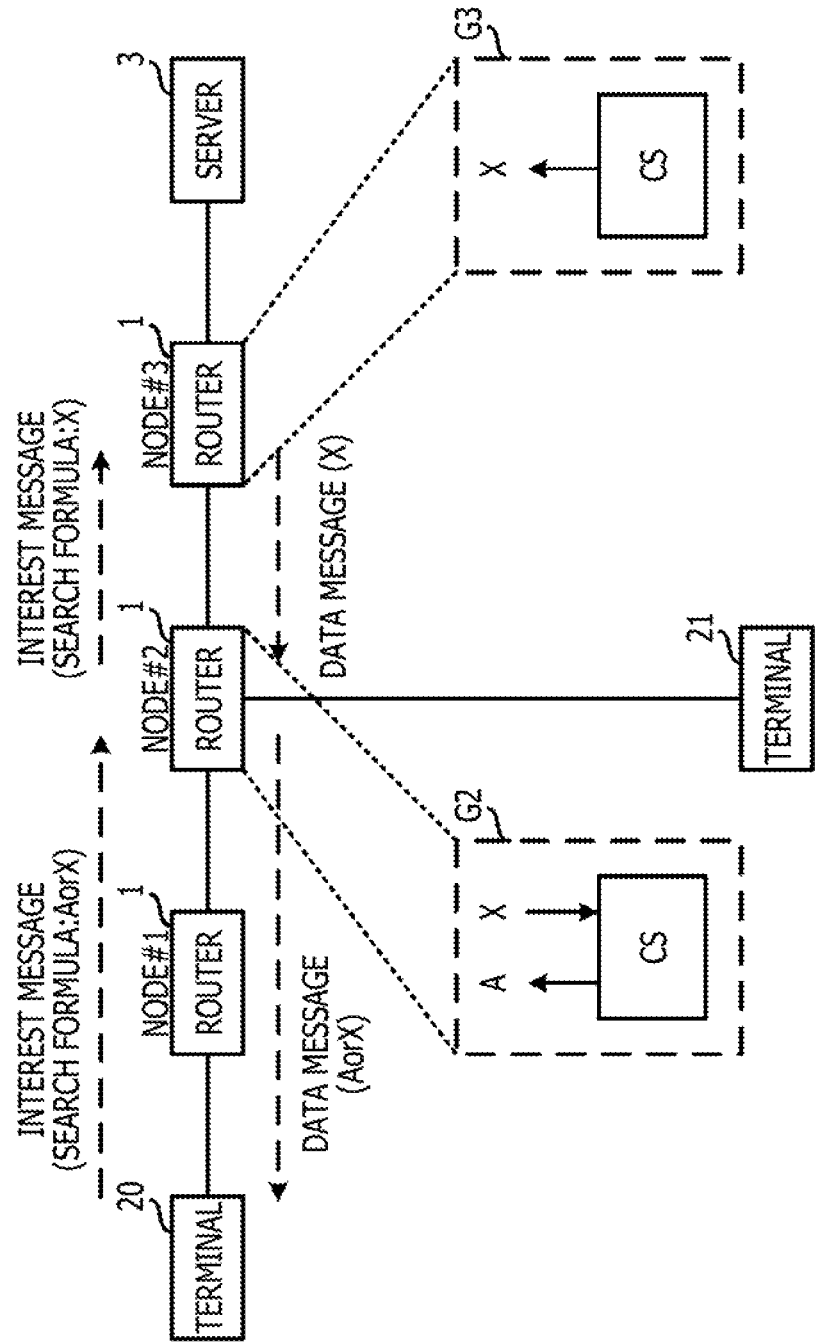
FIG. 6 is a view illustrating an example of operation of a relay system.

In FIG. 6, operation of the relay system according to the present example is illustrated. In FIG. 6, configurations in common with those of FIG. 1 are denoted by same reference symbols, and overlapping description of them is omitted herein. The router 1 of the node #2 is an example of a first relay apparatus. The router 1 of the node #3 is an example of a second relay apparatus.

The terminal 20 transmits an interest message in which the search formula "A or X" is designated. In the router 1 of the node #2, content data corresponding to the search formula "A" exists in the CS 132. Therefore, the router 1 of the node #2 generates an interest message in which the search formula "X" for searching for missing data is designated and transmits the interest message to the router 1 of the node #3. For example, the interest generation unit 103 of the router 1 of the node #2 requests the router 1 of the node #3 for content data corresponding to the search formula "X."

In the router 1 of the node #3, content data corresponding to the search formula "X" exists in the CS 132. Therefore, as indicated by reference symbol G3, the router 1 of the node #3 reads out the content data from the CS 132 and transmits a data message in which the content data is included to the router 1 of the node #2. For example, the router 1 of the node #3 searches out content data requested from the interest generation unit 103 of the router 1 of the node #2 from within the CS 132 and transmits the searched out content data to the router 1 of the node #2.

In the router 1 of the node #2, the relay processing unit 100 receives the data message from the router 1 of the node #3. The cache processing unit 102 registers the content data corresponding to the search formula "X" into the CS 132 as indicated by reference character G2. The data generation unit 101 reads out the content data corresponding to the search formula "A" from the CS 132 and combines the read out content data with the content data corresponding to the search formula "X." Consequently, content data corresponding to the search formula "A or X" is generated.

The router 1 of the node #2 transmits a data message including the content data corresponding to the search formula "A or X" to the terminal 20. Consequently, the terminal 20 acquires the content data requested through the interest message.

The example described above is directed to a case in which the search formula "A or X" is designated in the interest message. However, also where a search formula "A & X" is designated, the router 1 operates in accordance with the substance described with reference to FIG. 4.

Figure 7:
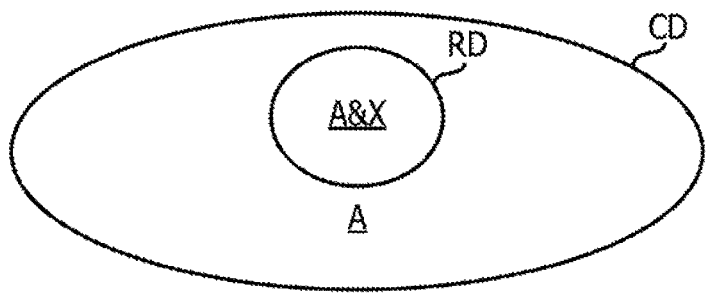
FIG. 7 is a view illustrating examples of a relationship between a set of cache data and a set of requested content data where "&" is included in a search formula.
Figure 7:
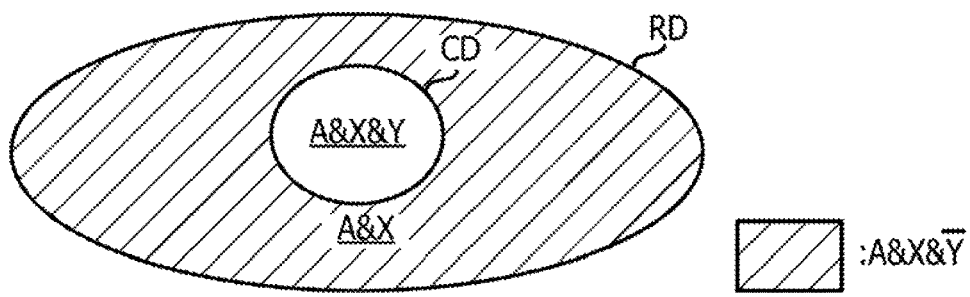
Figure 7:
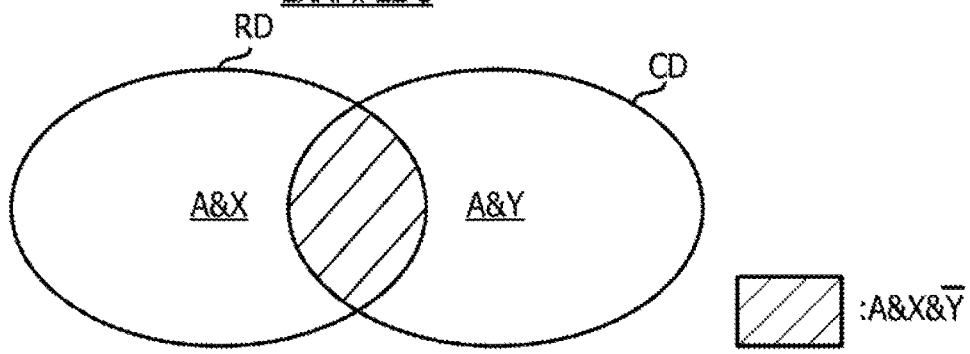
Figure 7:
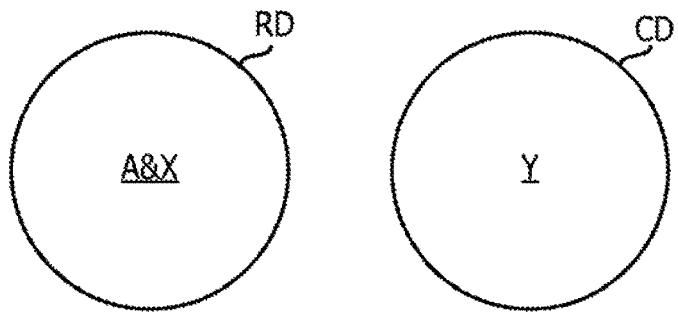

In FIG. 7, examples of a relationship between a set CD of cache data and a set RD of requested content data where "&" is included in the search formula are illustrated. In the following, examples 1 to 4 are described successively.

The example 1 illustrates a case in which cache data corresponds to the search formula "A" and requested content data corresponds to the search formula "A & X." Such a case as just described may be considered a case in which a search formula "curry and potato" is designated in the interest message and cache data (content data) corresponding to a search formula "curry" exists in the CS 132.

In this case, the set CD of the cache data includes the set RD of the requested content data. Therefore, the interest generation unit 103 may not request a different router 1 for missing data through an interest message. The search processing unit 105 extracts the cache data corresponding to the search formula "A & X" from within the CS 132 by keyword arithmetic operation. Then, the data generation unit 101 generates a data message corresponding to the search formula "A & X" from the extracted cache data.

The example 2 illustrates a case in which the cache data corresponds to a search formula "A & X & Y" and the requested content data corresponds to a search formula "A & X." Such a case as just described may be considered a case in which a search formula "curry & potato" is designated in the interest message and cache data (content data) corresponding to a search formula "curry & potato & carrot" exists in the CS 132.

In this case, the set CD of the cache data is a subset of the set RD of the requested content data. Therefore, the interest generation unit 103 requests a different router 1 for missing data (referred to a portion indicated by slanting lines) through an interest message. The search formula for missing data is represented by the expression (1) given below. The search processing unit 105 extracts cache data corresponding to the search formula "A & X" as fit data from within the CS 132 by keyword arithmetic operation. Then, the data generation unit 101 generates a data message corresponding to the search formula "A & X" from the cache data corresponding to the search formula "A & X" and the missing data received from the different router 1.

$$A \& X \& \overline{Y} \tag{1}$$

The example 3 illustrates a case in which the cache data corresponds to a search formula "A & Y" and the requested content data corresponds to another search formula "A & X." Such a case as just described may be considered a case in which a search formula "curry and potato" is designated in the interest message and cache data (content data) corresponding to a search formula "curry and carrot" exists in the CS 132.

In this case, the subset of the set CD of the cache data is a subset of the set RD of the requested content data. Therefore, the interest generation unit 103 requests a different router 1 for the missing data (refer to a portion indicated by slanting lines) through an interest message. The search formula for the missing data is represented by the expression (1) given above. The search processing unit 105 extracts the cache data corresponding to the search formula "A & X & Y" as fit data from within the CS 132 by keyword arithmetic operation. Then, the data generation unit 101 generates a data message corresponding to the search formula "A & X" from the cache data corresponding to the search formula "A & X & Y" and the missing data received from the different router 1.

The example 4 illustrates a case in which the cache data corresponds to a search formula "Y" and the requested content data corresponds to another search formula "A & X." Such a case as just described may be a case in which a search formula "curry and potato" is designated in the interest message and cache data (content data) corresponding to a search formula "beef bowl" exists in the CS 132.

In this case, the set CD of the cache data and the set RD of the requested content data do not have an overlapping portion. Therefore, the relay processing unit 100 relays the interest message in which the search formula "A & X" is designated as it is to the different router 1. If the relay processing unit 100 receives a data message responding to the interest message, the relay processing unit 100 relays the data message to the terminal 20 or 21.

In this manner, the search processing unit 105 searches for fit data by extracting cache data corresponding to a search formula in which a keyword is included from within the CS 132. Therefore, the search processing unit 105 may easily search out fit data that matches with the keyword from the CS 132.

Figure 8:
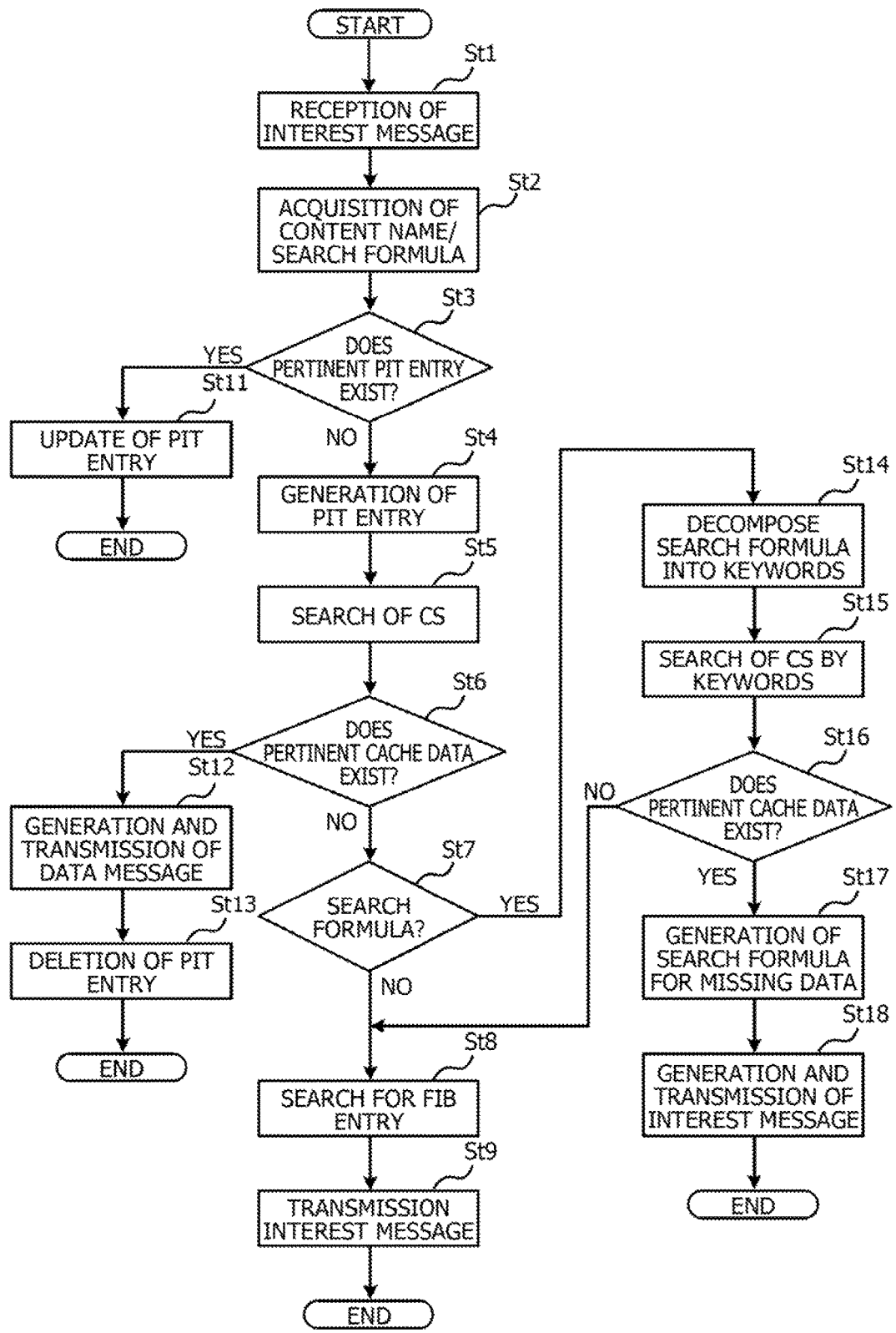
FIG. 8 is a flow chart illustrating an example of a process for an interest message.

FIG. 8 is a flow chart illustrating an example of a process for an interest message. The relay processing unit 100 receives an interest message (St1). Then, the relay processing unit 100 acquires a content name or a search formula from the interest message (St2).

Then, the relay processing unit 100 refers to the PIT 131 to decide whether or not a PIT entry pertinent to the acquired content mane or search formula exists (St3). If a pertinent PIT entry exists (Yes at St3), the relay processing unit 100 updates the PIT entry by adding a FACE number in accordance with the interest message to the PIT entry (St11), and ends the processing.

If a pertinent PIT entry does not exist (No at St3), the relay processing unit 100 generates a PIT entry including the FACE number in accordance with the interest message (St4). Then, the search processing unit 105 searches the CS 132 for cache data that fully coincides with the content name or search formula (St5).

The relay processing unit 100 decides from a result of the search whether or not pertinent cache data exists (St6). If pertinent cache data exists (Yes at St6), the relay processing unit 100 generates a data message including the cache data and transmits the data message to the terminal 20 or 21 (St12). Then, the relay processing unit 100 deletes the pertinent PIT entry (St13).

When pertinent cache data does not exist (No at St6), the relay processing unit 100 decides whether or not the designation of the interest message is a search formula (St7). If the designation of the interest message is a content name (No at St7), the relay processing unit 100 searches for an FIB entry which has the greatest number of characters coincident with those of the content name (St8).

Then, the relay processing unit 100 transmits the interest message from a communication port 14 corresponding to the FACE number of the searched out FIB entry (St9). Consequently, the interest message is relayed to the different router 1.

Where the designation of the interest message is a search formula (Yes at St7), the search formula analysis unit 104 decompose the search formula into keywords (St14). Then, the search processing unit 105 searches the CS 132 for cache data that fits with the keywords, for example, for fit data (St15).

Then, the relay processing unit 100 decides, from a result of the search, whether or not pertinent cache data exists (St16). If pertinent cache data does not exist (No at St16), the relay processing unit 100 executes processes at the subsequent steps beginning with St8 described hereinabove.

If pertinent cache data exists (Yes at St16), the data generation unit 101 generates a search formula for missing data (St17). The data generation unit 101 generates an interest message in which the search formula is designated and transmits the interest message through the relay processing unit 100 (St18). The processes for the interest message are executed in this manner.

Figure 9:
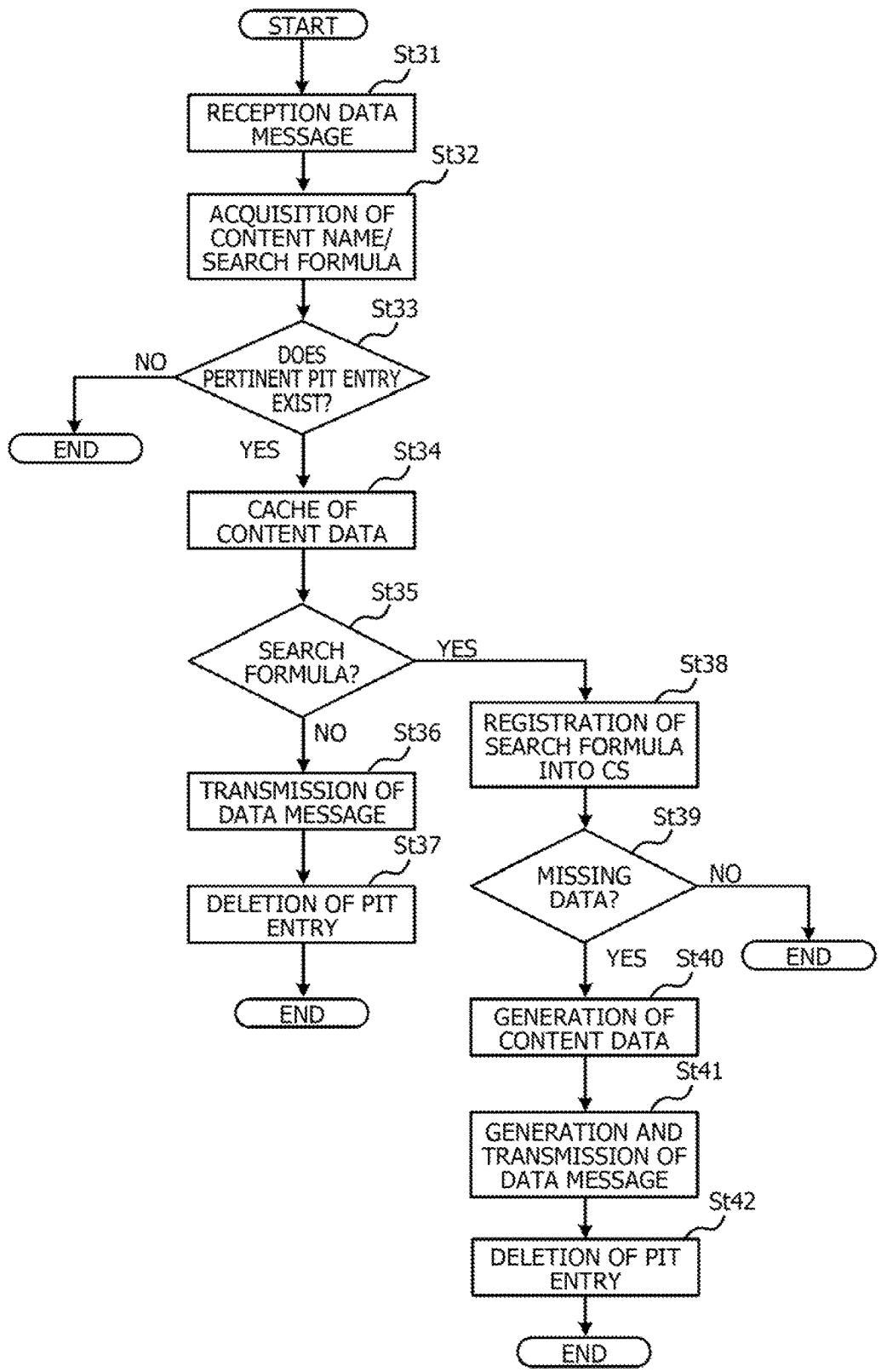
FIG. 9 is a flow chart illustrating an example of a process for a data message.

FIG. 9 is a flow chart illustrating an example of a process for a data message. The relay processing unit 100 receives a data message (St31). Then, the relay processing unit 100 acquires a content name or a search formula from the data message (St32).

Then, the relay processing unit 100 decides whether or not a PIT entry pertinent to the acquired content name or search formula exists (St33). If a pertinent PIT entry does not exist (No at St33), the relay processing unit 100 ends the processing.

If a pertinent PIT entry exists (Yes at St33), the cache processing unit 102 caches content data in an associated relationship with the content name into the CS 132 (St34). Then, the relay processing unit 100 decides whether or not the designation of the interest message is a search formula (St35).

If the designation of the interest message is a content name (No at St35), the relay processing unit 100 transmits the received data message from a communication port 14 that corresponds to the FACE number of the pertinent PIT entry (St36). Consequently, the data message is relayed to the terminal 20 or 21. Thereafter, the relay processing unit 100 deletes the pertinent PIT entry (St37), and ends the processing.

If the designation of the interest message is a search formula (Yes at St35), the cache processing unit 102 registers the search formula in an associated relationship with the content data cached into the CS 132 by the process at St34 described hereinabove (St38). Then, the relay processing unit 100 decides whether or not the cached content data is missing data requested by the interest message transmitted by the process at St18 of FIG. 8 (St39). At this time, the relay processing unit 100 performs the decision process by referring to the search formula for a PIT entry and comparing the search formula with the search formula included in the data message.

If the cached content data is not the missing data (No at St39), the relay processing unit 100 ends the processing. If the cached content data is the missing data (Yes at St39), the data generation unit 101 combines the pertinent cache data and the missing data with each other to generate content data requested from the terminal 20 or 21 (St40).

Then, the data generation unit 101 generates a data message that includes the content data and transmits the data message through the relay processing unit 100 (St41). Then, the relay processing unit 100 deletes the pertinent PIT entry (St42), and ends the processing.

So far as described above, the router 1 of the embodiment caches content data of a request target of the terminal 20 or 21 into the CS 132 and relays the content data to the terminal 20 or 21. The router 1 includes the relay processing unit 100, the search formula analysis unit 104, the search processing unit 105, the interest generation unit 103 and the data generation unit 101.

The relay processing unit 100 receives an interest message in which a search formula for content data of a request target from the terminal 20 or 21 is included. The search formula analysis unit 104 acquires the search formula from the interest message and decomposes the search formula into keywords. The search processing unit 105 searches for fit data that fits with the keywords from the CS 132. The interest generation unit 103 requests a different router 1 for missing data other than the fit data from among the content data of the request target.

The relay processing unit 100 receives the missing data requested by the interest generation unit 103 from the different router 1. The data generation unit 101 combines the missing data received by the relay processing unit 100 and the fit data with each other to generate content data of the request target. The relay processing unit 100 transmits the content data of the request target generated by the data generation unit 101 to the terminal 20 or 21.

According to the configuration described above, the interest generation unit 103 requests for only part of the content data instead of for all of the content data of the request target of the terminal 20 or 21. Therefore, the traffic amount of content data to be received from the different router 1 may be reduced by transfer of the interest message, from that when all of the content data of the request target are received. Accordingly, the transmission bandwidth in the network used by the content data may be reduced.

The relay system of the embodiment includes a plurality of routers 1. Each router 1 caches content data of a request target of the terminal 20 or 21 into the CS 132 and relays the content data to the terminal 20 or 21. The router 1 includes the relay processing unit 100, the search formula analysis unit 104, the search processing unit 105, the interest generation unit 103 and the data generation unit 101.

The relay processing unit 100 receives an interest message in which a search formula for content data of a request target from the terminal 20 or 21 is included. The search formula analysis unit 104 acquires the search formula from the interest message and decomposes the search formula into keywords. The search processing unit 105 searches for fit data that fits with the keywords from the CS 132. The interest generation unit 103 requests a different router 1 for missing data other than the fit data from among the content data of the request target.

The relay processing unit 100 receives the missing data requested by the interest generation unit 103 from the different router 1. The data generation unit 101 combines the missing data received by the relay processing unit 100 and the fit data with each other to generate content data of the request target. The relay processing unit 100 transmits the content data of the request target generated by the data generation unit 101 to the terminal 20 or 21.

The different router 1 searches the CS 132 for the missing data requested from the interest generation unit 103 and transmits the searched out missing data to the router 1 that includes the interest generation unit 103.

The relay system of the embodiment includes the router 1 described above, and therefore, exhibits working effects similar to those described hereinabove.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A relay method executed by a system that includes a first relay apparatus and a second relay apparatus each of which stores cached data transmitted from a server in response to requests from a terminal apparatus in a local database, the relay method comprising:
   by a first processor included in the first relay apparatus,
      receiving a packet that includes a search formula for a request target from the terminal apparatus;
      acquiring the search formula from the packet;
      decomposing the search formula into a plurality of keywords;
      acquiring, for any of the keywords having corresponding data existing in a first local database, fit data included in the request target by searching the cached data for the keywords in the first local database of the first relay apparatus;
      requesting the second relay apparatus for missing data of the request target that does not exist in the first local database;
   acquiring, by a second processor included in the second relay apparatus, any of the missing data requested from the first relay apparatus accessible by the second relay apparatus;
   receiving, by the first relay apparatus, the missing data acquired by the second relay apparatus;
   combining, by the first processor, the fit data and the missing data to produce generated data of the request target; and
   transmitting, by the first relay apparatus, the generated data of the request target to the terminal apparatus.

2. The relay method according to claim 1, wherein the acquiring the missing data includes searching for the missing data in a second local database of the second relay apparatus.

3. The relay method according to claim 1,
   further comprising storing, by the first processor, additional data of the request target, transmitted from the server in response to receipt of the search formula for the request target, adding to the cached data in the first local database,
   wherein the searching includes extracting from the cached data the fit data corresponding to the search formula in which the keyword is included.

4. The relay method according to claim 1, wherein the requesting includes:
   generating a new search formula for searching for the missing data, and
   transmitting the new search formula to the second relay apparatus.

5. The relay method according to claim 1, wherein
   the first relay apparatus is coupled between the terminal apparatus and the second relay apparatus, and
   the second relay apparatus is coupled between the server and the first relay apparatus.

6. The relay method according to claim 1, further comprising:
   determining, by the first processor, whether all of the request target exists in the first local database;
   extracting the fit data corresponding to the request target from the first local database, when all of the request target exists in the first local database; and
   transmitting the fit data extracted by the extracting to the terminal apparatus.

7. The relay method according to claim 1, wherein the decomposing includes decomposing the search formula into the plurality of keywords, when all of the request target does not exist in the first local database.

8. The relay method according to claim 1, wherein the decomposing includes extracting the plurality of keywords included in the search formula from the search formula.

9. A relay apparatus that stores data, obtained for a request target, transmitted from a server and requested by a terminal apparatus, in a database and relays the data of the request target to the terminal apparatus, the relay apparatus comprising:
   a memory; and
   a processor coupled to the memory and configured to:
      receive a packet that includes a search formula of the request target from the terminal apparatus,
      acquire the search formula from the packet,
      decompose the search formula into a plurality of keywords,
      acquire, for any of the keywords having corresponding data existing in a first local database, fit data included in the request target by searching the cached data for the keywords in the first local database of the first relay apparatus,
      request another relay apparatus for missing data of the request target that does not exist in the first local database and is accessible by the other relay apparatus,
      receive the missing data acquired by the other relay apparatus;
      combine the fit data and the missing data to produce generated data of the request target, and
      transmit the generated data of the request target to the terminal apparatus.

10. The relay apparatus according to claim 9, wherein the other relay apparatus acquires the missing data by searching for the missing data in a second local database of the other relay apparatus.

* * * * *